United States Patent
Desiderio et al.

(10) Patent No.: US 9,982,669 B2
(45) Date of Patent: May 29, 2018

(54) VARIABLE RETRACTION RATE PUMP AND METHOD FOR OPERATING SAME

(71) Applicant: Caterpillar Inc., Peoria, IL (US)

(72) Inventors: Paul Desiderio, Avon, CT (US); Daniel Puckett, Peoria, IL (US); Steven Grant, Groveland, IL (US); Joshua Steffen, El Paso, IL (US)

(73) Assignee: Caterpillar Inc., Deerfield, IL (US)

( * ) Notice: Subject to any disclaimer, the term of this patent is extended or adjusted under 35 U.S.C. 154(b) by 470 days.

(21) Appl. No.: 14/534,660

(22) Filed: Nov. 6, 2014

(65) Prior Publication Data

US 2016/0138583 A1 May 19, 2016

(51) Int. Cl.
| | |
|---|---|
| F04B 49/00 | (2006.01) |
| F04B 23/02 | (2006.01) |
| F04B 49/20 | (2006.01) |
| F04B 19/22 | (2006.01) |
| F04B 53/14 | (2006.01) |
| F04B 53/16 | (2006.01) |
| F02D 19/06 | (2006.01) |
| F02D 19/08 | (2006.01) |

(52) U.S. Cl.
CPC .......... *F04B 49/20* (2013.01); *F02D 19/0605* (2013.01); *F02D 19/0613* (2013.01); *F02D 19/08* (2013.01); *F04B 19/22* (2013.01); *F04B 23/02* (2013.01); *F04B 53/14* (2013.01); *F04B 53/16* (2013.01); *Y02T 10/36* (2013.01)

(58) Field of Classification Search
CPC .... F04B 15/06; F04B 15/08; F04B 2015/081; F04B 2015/0812; F04B 2015/0814; F04B 2015/0816; F04B 2015/0818; F04B 2015/082; F04B 2015/0822; F04B 2015/0824; F04B 2015/0826; F17C 7/00; F17C 7/02; F17C 7/04; F17C 2227/0128; F17C 2227/0135; F17C 2227/0142; F17C 2227/0157; F17C 2227/0164; F17C 2227/0171; F17C 2227/04; F02D 19/0602; F02D 19/0607; F02D 19/0647
USPC .................................................. 222/385, 639
See application file for complete search history.

(56) References Cited

U.S. PATENT DOCUMENTS

| | | |
|---|---|---|
| 2,927,557 A | 3/1960 | Tyson |
| 3,692,438 A | 9/1972 | Schapel |
| 4,990,058 A * | 2/1991 | Eslinger .................. F04B 9/113 417/18 |
| 6,769,884 B2 | 8/2004 | Miller |

(Continued)

FOREIGN PATENT DOCUMENTS

WO 2013/049935 A1 4/2013

*Primary Examiner* — Nathan Zollinger
(74) *Attorney, Agent, or Firm* — Baker Hostetler

(57) ABSTRACT

A pump system includes a pump and a storage volume in fluid communication with a discharge port of the pump. The pump includes a housing defining a pump bore and a pump piston disposed in sliding engagement with the pump bore, the pump piston being in selective fluid communication with the discharge port of the pump. A method for operating the pump system includes determining a time to drain an amount of a first fluid from the storage volume, and retracting the pump piston within the pump bore at a target retraction rate based at least partly on the time to drain the first fluid from the storage volume.

6 Claims, 4 Drawing Sheets

(56) References Cited

U.S. PATENT DOCUMENTS

| | | | |
|---|---|---|---|
| 7,144,228 B2* | 12/2006 | Emmer | F17C 7/04 |
| | | | 417/398 |
| 8,152,476 B2 | 4/2012 | Babicki et al. | |
| 8,726,785 B2 | 5/2014 | Batenburg | |
| 8,757,986 B2 | 6/2014 | Villareal et al. | |
| 9,188,069 B2* | 11/2015 | Steffen | F02D 19/0647 |
| 9,297,245 B2* | 3/2016 | Stephenson | E21B 41/0092 |
| 2014/0244049 A1 | 8/2014 | Villareal et al. | |
| 2015/0176880 A1* | 6/2015 | Ochiai | F25B 49/005 |
| | | | 62/115 |

* cited by examiner

VARIABLE RETRACTION RATE PUMP AND METHOD FOR OPERATING SAME

TECHNICAL FIELD

This patent disclosure relates generally to positive displacement pumps and, more particularly, to retraction rate control for pistons of positive displacement pumps.

BACKGROUND

Positive displacement pumps are known for pressurizing a fluid, effecting a fluid flow, or combinations thereof. Positive displacement pumps may trap a fixed mass of fluid in a pumping chamber and then perform work on the fixed mass of fluid by deforming or displacing a boundary of the pumping chamber. Reciprocating positive displacement pumps include plunger pumps, piston pumps, and diaphragm pumps, for example.

Check valves on an inlet to the pumping chamber, an exit from the pumping chamber, or both, may at least partially define the pumping chamber. An inlet check may allow flow only in a direction into the pumping chamber via the inlet check valve, and a discharge check valve may allow flow only in a direction out of the pumping chamber via the discharge check valve.

U.S. Pat. No. 4,990,058 (hereinafter "the '058 patent"), entitled "Pumping Apparatus and Pump Control Apparatus and Method," purports to address the problem of accurately metering liquids over an extended flow range. The '058 patent describes velocity and position profile generator means to achieve constant average flow rate despite acceleration and deceleration which occur in each extend and retract phase of a reciprocating pump cycle. The '058 patent further describes a pump control method including designating a selected flow rate at which fluid is desired to be output by the pump; identifying the position of the movable member of the pump; and generating a velocity value and a position value in response to the designated flow rate.

However, the flowrate control described in the '058 patent may not be consistent with the needs of some pumping applications. For example, other applications may be tolerant to variations in the flow rate, and may benefit more from tailoring the pumping cycle to achieve other operability goals, such as maximum flow delivery or energy efficiency, for example.

Accordingly, there is a need for improved positive displacement pumps and improved methods for controlling positive displacement pumps to address the aforementioned problems or other problems in the art.

SUMMARY

An aspect of the disclosure describes a method for operating a pump system. The pump system includes a pump and a storage volume in fluid communication with a discharge port of the pump. The pump includes a housing defining a pump bore and a pump piston disposed in sliding engagement with the pump bore, the pump piston being in selective fluid communication with the discharge port of the pump. The method comprises determining a time to drain an amount of a first fluid from the storage volume, and retracting the pump piston within the pump bore at a target retraction rate based at least partly on the time to drain the first fluid from the storage volume.

According to another aspect of the disclosure, a pump system comprises a pump including a pump housing defining a pump bore, and a pump piston disposed in sliding engagement with the pump bore, a storage volume in fluid communication with a discharge port of the pump, the pump piston being in selective fluid communication with the discharge port of the pump, and a controller operatively coupled to the pump. The controller is configured to determine a time to drain an amount of a first fluid from the storage volume, and retract the pump piston within the pump bore at a target retraction rate based at least partly on the time to drain the first fluid from the storage volume.

According to another aspect of the disclosure, an article of manufacture comprises non-transient machine-readable instructions encoded thereon for causing a processor to perform the operations of determining a time to drain an amount of a first fluid from a storage volume in fluid communication with a discharge port of a pump, and retracting a pump piston within a bore of the pump at a target retraction rate based at least partly on the time to drain the first fluid from the storage volume.

DETAILED DESCRIPTION

Aspects of the disclosure will now be described in detail with reference to the drawings, wherein like reference numbers refer to like elements throughout, unless specified otherwise.

Figure 1:
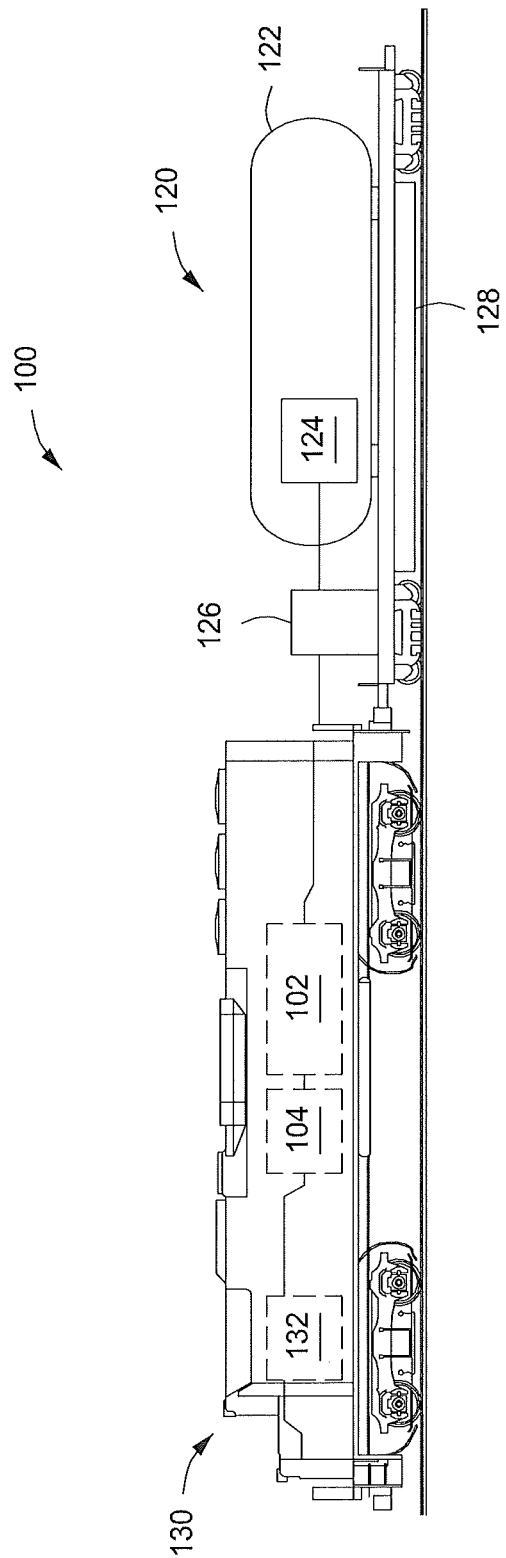
FIG. 1 is a schematic side view of a machine, according to an aspect of the disclosure.

FIG. 1 illustrates a machine 100, according to an aspect of the disclosure. The machine can be a railroad vehicle, an "over-the-road" vehicle such as a truck used in transportation, an off-road vehicle, or may be any other type of machine that performs an operation associated with an industry such as mining, construction, farming, transportation, or any other industry known in the art. For example, the machine may be an off-highway truck, a railroad locomotive, an earth-moving machine, such as a wheel loader, an excavator, a dump truck, a backhoe, a motor grader, a material handler, or the like. The term "machine" can also refer to stationary equipment like a generator that is driven by an internal combustion engine to generate electricity. The specific machine 100 illustrated in FIG. 1 is a railroad locomotive.

The machine 100 includes an internal combustion (IC) engine 102 operatively coupled to a controller 104. The IC engine 102 may be a reciprocating piston engine, such as a compression ignition engine or a spark ignition engine, a turbomachine such as a gas turbine, combinations thereof, or any other internal combustion engine known in the art.

The IC engine 102 may receive fuel from one or more fuel supply systems 120, including, but not limited to, a liquid fuel supply system, a gaseous fuel supply system, or combinations thereof. Liquid fuel provided by a liquid fuel supply system may include distillate diesel, biodiesel, dimethyl ether, seed oils, gasoline, ethanol, liquefied petroleum gas (LPG), liquefied natural gas (LNG), combinations thereof, or any other combustible liquid fuel known in the art. Gaseous fuel provided by a gaseous fuel supply system may include gaseous propane, hydrogen, methane, ethane, butane, natural gas, combinations thereof, or any other combustible gaseous fuel known in the art. The IC engine 102 may be configured to simultaneously burn mixtures of fuel from two or more fuel supply systems 120 with an oxidizer.

It will be appreciated that some fuels, such as LNG, may be stored in a liquid state and supplied to the engine 102 in a liquid state, a gaseous state, or combinations thereof. It will be further appreciated that some liquid fuels may be stored at cryogenic temperatures that are much lower than an ambient temperature of the machine 100. According to an aspect of the disclosure, cryogenic temperatures are temperatures less than about −238 degrees Fahrenheit.

The fuel source 120 includes a supply tank 122 that is fluidly coupled to the IC engine 102. The fluid coupling between the supply tank 122 and the engine 102 may include a low pressure transfer pump 124, a fluid conditioning system 126, or combinations thereof. The fluid conditioning system 126 may include a high pressure pump, a filter, a heat exchanger, sensors, control valves, actuators, accumulators, combinations thereof, or any other structures known to benefit the conditioning of fuel for the IC engine 102. The fuel supply system 120 may also be operatively coupled to the controller 104 for control thereof.

Although the specific fuel supply system 120 illustrated in FIG. 1 is supported or carried by a railroad tender car 128, it will be appreciated that the fuel supply system may be incorporated into other machines in other ways depending on the needs of the particular application.

The machine 100 may include an operator cab 130 that includes one or more control input devices 132 that are operatively coupled to the controller 104. The control input devices 132 may include manual control input devices configured to communicate manual control inputs from an operator in the cab 130 to the controller 104; automatic control input devices such as open-loop controllers, closed-loop controllers, or programmable logic controllers, for example; remote control input devices such as wired or wireless telemetry devices; combinations thereof; or any other control input device known in the art.

Figure 2:
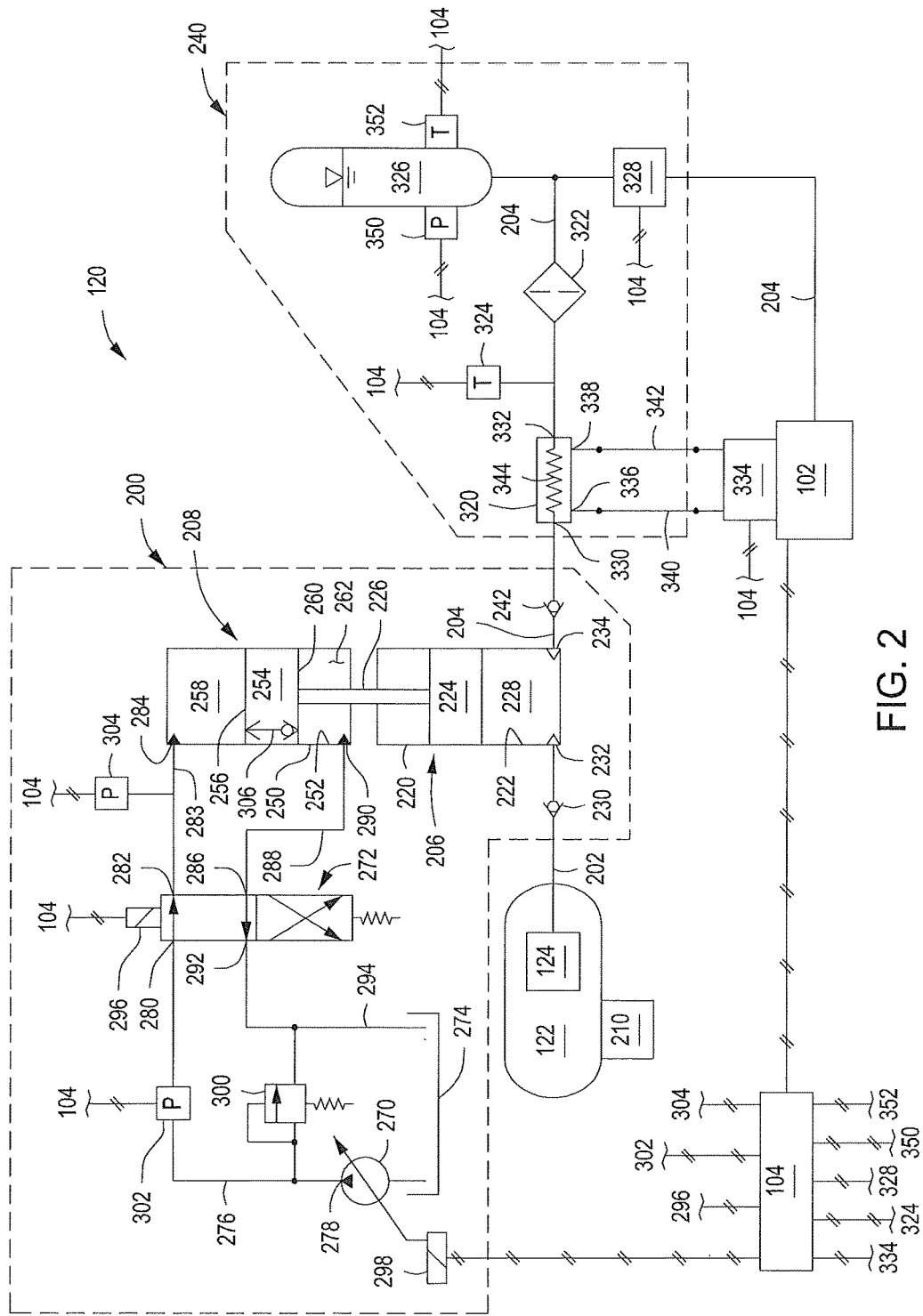
FIG. 2 is fluid schematic of a fluid supply system, according to an aspect of the disclosure.

FIG. 2 shows a fluid schematic of a fuel supply system 120 according to an aspect of the disclosure. The fuel supply system 120 illustrated in FIG. 2 includes a pump system 200 in fluid communication with a supply tank 122 via a pump inlet conduit 202, and in fluid communication with a fluid conditioning system 240 via a pump outlet conduit 204. The pump system 200 includes a pump 206 and a motor 208 operatively coupled to the pump 206.

According to an aspect of the disclosure, the pump 206 is a reciprocating positive displacement pump. According to another aspect of the disclosure, the pump 206 is a reciprocating piston positive displacement pump, as specifically illustrated in FIG. 2. However, it will be appreciated that the pump 206 could be other types of positive displacement pumps, including, but not limited to, plunger pumps, diaphragm pumps, and rotary positive displacement pumps.

The supply tank 122 is configured to store a first fluid in the fuel supply system 120. Unless specified otherwise, the term "fluid" is used herein to describe gases, liquids, slurries, combinations thereof, or other similar matter that tends to flow in response to applied sheer stress. The first fluid may be a gaseous combustible fuel or a liquid combustible fuel suitable for fueling the IC engine 102, for example. However, it will be appreciated that aspects of the present disclosure may be advantageously applied to pump systems 200 for non-combustible fluids such as water, air, liquid or gaseous nitrogen, or other non-combustible fluids known in the art. According to an aspect of the disclosure, the supply tank 122 is a cryogenic supply tank for storage of LNG, and includes a cryogenic system 210 in thermal communication with the supply tank 122 for controlling a temperature of the LNG stored within the supply tank 122.

The pump 206 includes a pump housing 220 defining a pump bore 222 therein, and a pump piston 224 configured to reciprocate in sliding engagement with the pump bore 222. The pump piston 224 is operatively coupled to the motor 208 via a rod or shaft 226 for transmission of mechanical power therebetween. The pump piston 224 and the pump bore 222 at least partly define a variable volume pumping chamber 228, such that a volume of the pumping chamber 228 varies with translating motion of the pump piston 224 relative to the pump housing 220. Although only one pump bore 222 and only one pump piston 224 are shown in FIG. 2, it will be appreciated that the pump 206 may have any number of pistons and bores to suit the particular application.

An inlet port 232 of the pumping chamber 228 is in fluid communication with the supply tank 122 via the pump inlet conduit 202, which includes a pump inlet check valve 230. The pump inlet check valve 230 permits flow of the first fluid only in a flow direction from the supply tank 122 toward the pumping chamber 228. An outlet port 234 of the pumping chamber 228 is in fluid communication with a fluid conditioning system 240 via the pump outlet conduit 204, which includes a pump outlet check valve 242. The pump outlet check valve 242 permits flow of the first fluid only in a flow direction from the pumping chamber 228 toward the fluid conditioning system 240.

Accordingly, during a retraction stroke of the pump piston 224, where a volume of the pumping chamber 228 increases, the pump inlet check valve 230 may allow a flow of the first fluid from the supply tank 122 into the pumping chamber 228, and the pump outlet check valve 242 may prevent a flow of the first fluid from the fluid conditioning system 240 back into the pumping chamber 228. Conversely, during a pumping stroke of the pump piston 224, where a volume of the pumping chamber 228 decreases, the pump inlet check valve 230 may prevent a flow of the first fluid from the pumping chamber 228 back into the supply tank 122, and the pump outlet check valve 242 may allow a flow of the first fluid from the pumping chamber 228 into the fluid conditioning system 240.

The motor 208 may take the form of a linear motor, a rotary shaft motor having an offset crank journal pivotably coupled to a reciprocating connecting rod, or any other motor-linkage system known in the art for effecting reciprocating motion. The motor 208 may be driven by hydraulic power, electrical power, pneumatic power, combinations thereof, or any other power source known in the art for driving a motor. The motor 208 specifically illustrated in FIG. 2 is a linear hydraulic motor including a motor housing 250 that defines a motor bore 252 therein, and a motor piston 254 configured to reciprocate in sliding engagement with the motor bore 252. The motor piston 254 is operably coupled to the pump piston 224 via the shaft 226.

A head-end face 256 of the motor piston 254 and the motor bore 252 at least partly define a head-end chamber 258, and a rod-end face 260 of the motor piston 254 and the motor bore 252 at least partly define a rod-end chamber 262.

The pump system 200 may further include a hydraulic pump 270 and a switching valve 272 for actuating the motor 208, as next described. The hydraulic pump 270 draws a second fluid or a working fluid from a reservoir 274, performs work on the working fluid, and discharges the working fluid into a working fluid supply conduit 276 via an outlet port 278. The working fluid supply conduit 276 is in fluid communication with a first port 280 of the switching valve 272.

A second port 282 of the switching valve 272 is in fluid communication with the head-end chamber 258 of the motor 208 via a head-end conduit 283 and a head-end port 284. A third port 286 of the switching valve 272 is in fluid communication with the rod-end chamber 262 of the motor 208 via a rod-end conduit 288 and a rod-end port 290. A fourth port 292 of the switching valve 272 may be in fluid communication with the reservoir 274 via a return conduit 294.

The switching valve 272 shown specifically in FIG. 2 is a four-port, two-position valve. However, it will be appreciated that other structures may be employed to effect equivalent or substantially similar functionality. When configured in a first position, the switching valve 272 effects fluid communication between the first port 280 and the second port 282, effects fluid communication between the fourth port 292 and the third port 286, blocks fluid communication between the first port 280 and the third port 286, and blocks fluid communication between the fourth port 292 and the second port 282. Accordingly, when configured in the first position, the switching valve 272 effects fluid communication between the head-end chamber 258 of the motor 208 and the hydraulic pump 270, and effects fluid communication between the rod-end chamber 262 of the motor 208 and the reservoir 274. In turn, as shown in FIG. 2, the first position of the switching valve 272 drives a pumping stroke of the pump piston 224.

When configured in a second position, the switching valve 272 effects fluid communication between the first port 280 and the third port 286, effects fluid communication between the fourth port 292 and the second port 282, blocks fluid communication between the first port 280 and the second port 282, and blocks fluid communication between the fourth port 292 and the third port 286. Accordingly, when configured in the second position, the switching valve 272 effects fluid communication between the rod-end chamber 262 of the motor 208 and the hydraulic pump 270, and effects fluid communication between the head-end chamber 258 of the motor 208 and the reservoir 274. In turn, as shown in FIG. 2, the second position of the switching valve 272 drives a retraction stroke of the pump piston 224.

The switching valve 272 may be actuated to toggle between its first position and its second position by an actuator 296. The actuator 296 may be a hydraulic actuator, an electrical actuator, a pneumatic actuator, combinations thereof, or any other valve actuator known in the art. Further, the actuator 296 may be operatively coupled to the controller 104 such that the controller 104 may direct the actuator 296 to toggle the switching valve 272 between its first position and its second position.

The hydraulic pump 270 may be a variable displacement pump having a displacement actuator 298 configured to vary a fluid displacement, and therefore a flow rate, of the hydraulic pump 270. The displacement actuator 298 may be a swashplate actuator or any other pump displacement actuator known in the art. The displacement actuator 298 may be operably coupled to the controller 104 such that the controller may effect changes to the displacement of the hydraulic pump 270 via the displacement actuator 298.

A relief valve 300 may effect selective fluid communication between the working fluid supply conduit 276 and the return conduit 294 to limit a pressure in the working fluid supply conduit 276. The working fluid supply conduit 276 may include a flowmeter 302 for measuring a flow of working fluid therethrough. The flowmeter 302 could be a paddle wheel flowmeter, a turbine flowmeter, a Pitot probe flowmeter, a calibrated orifice flowmeter, an ultrasonic flowmeter, combinations thereof, or any other flowmeter known in the art. The flowmeter 302 may be operatively coupled to the controller 104 to exchange data signals, receive power, or both, therewith.

Alternatively or additionally, the working fluid flowrate may be determined or calculated from knowledge of the speed of the hydraulic pump 270, a pumping characteristic of the hydraulic pump 270, and a position of the displacement actuator 298, which are all available to the controller 104.

A pressure sensor 304 may be in fluid communication with the head-end conduit 283 to sense a pressure therein. The pressure sensor 304 may be operatively coupled to the controller 104 to exchange data signals, receive power, or both, therewith.

The motor piston 254 may include a shuttle valve 306 to effect selective fluid communication between the head-end chamber 258 and the rod-end chamber 262. A pressure difference between the head-end chamber 258 and the rod-end chamber 262 may bias the shuttle valve 306 into one of two seated positions, where the two seated positions block fluid communication between the head-end chamber 258 and the rod-end chamber 262. However, upon reversing directions of travel of the motor piston 254, the shuttle valve 306 toggles from one seated position to another seated position and effects fluid communication between the head-end chamber 258 and the rod-end chamber 262 while in transition between the two seated positions.

The fluid conditioning system 240 may include a heat exchanger 320, a filter 322, a temperature sensor 324, an accumulator 326, a pressure regulator 328, or combinations thereof. The heat exchanger 320 may be configured to receive the first fluid in a liquid state at a first port 330, transfer heat into the first fluid, and discharge the first fluid in a gaseous state at a second port 332. According to an aspect of the disclosure, the heat exchanger 320 is configured to receive the first fluid as a liquid, evaporate the first fluid, and superheat the first fluid before discharging the first fluid from the second port 332 of the heat exchanger 320. A heat transfer fluid may be delivered from a thermal power source 334 to a third port 336 of the heat exchanger 320 via a supply conduit 340, and then returned from a fourth port 338 of the heat exchanger 320 back to the thermal power source 334 via a return conduit 342.

According to an aspect of the disclosure, the heat exchanger 320 is a non-contact heat exchanger, such that the first fluid flowing from the first port 330 to the second port 332 does not come into direct contact with a heat transfer fluid flowing from the third port 336 to the fourth port 338. Instead, the heat transfer fluid may transfer heat into the first fluid through a heat transfer wall 344 separating the two flow paths, for example, a shell-side fluid path and a tube-side fluid path.

The thermal power source 334 may be fluidly coupled to the engine 102, thermally coupled to the engine 102, or both. For example, fluids from the IC engine 102, such as engine coolant, engine lubrication oil, or engine exhaust, for example, may be delivered to the heat exchanger 320 to transfer heat into the first fluid via the thermal power source 334. Alternatively, a separate and distinct heat transfer fluid in the thermal power source 334 may be heated by surfaces of the IC engine 102 before delivery to the heat exchanger 320. Alternatively, the thermal power source 334 may be an electrical power source that delivers electrical energy to an electrical resistance heating element in the heat exchanger 320.

The thermal power source 334 may include pumps, fans, control valves, flow sensors, temperature sensors, combinations thereof, or any other structures known in the art to benefit delivery of a heat transfer fluid. Further, the thermal power source 334 may be operatively coupled to the controller 104, such that the controller may control a heat delivery rate from the thermal power source 334 to the heat exchanger 320.

The regulator 328 may be configured to control a pressure of the first fluid, a delivery rate of the first fluid to the IC engine 102, or combinations thereof. The regulator 328 may include valves, pressure regulators, actuators, sensors, or any other structures known in the art to benefit pressure or flow regulation. The regulator 328 may be operatively coupled to the controller 104, such that the controller 104 may control a pressure or flow of the first fluid via the regulator 328.

The accumulator 326 may include a resilient member for storing fluid pressure energy therein by performing work to deform the resilient member. The resilient member may include a mass of gas in contact with a free surface of the first fluid within the accumulator 326, a mass of gas trapped within a bladder within the accumulator 326, a spring acting on a piston in contact with the first fluid within the accumulator 326, combinations thereof, or any other resilient member known in the art for application in a fluid accumulator. The accumulator 326 may include a pressure sensor 350 and a temperature sensor 352 for sensing a pressure and a temperature of the first fluid within the accumulator 326, respectively. The pressure sensor 350 and the temperature sensor 352 may each be operatively coupled to the controller 104 to transmit a signal indicative of the pressure and temperature of the first fluid within the accumulator 326 to the controller 104.

The controller 104 may include a general purpose computer or processor that is programmed to perform any of the functions described herein. The controller may be integral to or separate from an engine controller or an overall machine controller. It will be understood that the controller 104 may be contained within a single housing or distributed across multiple housings throughout the machine 100. Further, it will be understood that the controller 104 may perform other functions not described herein.

Any of the control functions disclosed herein may be embodied in a non-transient machine-readable medium having instructions encoded thereon for causing the controller or other processor to perform operations according to the coded instructions. The machine-readable medium may include optical disks, magnetic disks, solid-state memory devices, or any other non-transient machine-readable medium known in the art.

INDUSTRIAL APPLICABILITY

The present disclosure is applicable to positive displacement pumps and, more particularly, to retraction rate control for positive displacement pumps. Some applications of positive displacement pumps may benefit from maintaining the pumped fluid in a liquid state to take advantage of the incompressible or nearly-incompressible nature of the liquid state. However, the first fluid within the pumping chamber 228 may inadvertently change phase from a liquid state to a gaseous state if the pressure and temperature within the pumping chamber 228 fall below the saturation line for the first fluid. Evaporation of even a fraction of the fluid within the pumping chamber 228 increases the net compressibility of the fluid within the pumping chamber 228, and in turn, may decrease pump mass flow, decrease pump energy efficiency, or both.

Evaporation of the pumped fluid is not a great concern during a pumping stroke, at least because the work done on the first fluid by the pump piston 224 during the pumping stroke tends to increase the pressure of the first fluid within the pumping chamber 228, and therefore tends to increase margin on evaporation of the liquid in the pumping chamber 228. However, during a retraction stroke of the pump piston 224, pressure in the pumping chamber 228 may transiently decrease, and in turn, erode margin on evaporation of the liquid in the pumping chamber 228. Erosion of evaporation margin during the retraction stroke of the pump piston 224 may increase with increasing rate of retracting the pump piston 224 during a retraction stroke, and if the pump piston 224 is retracted too quickly, then all or some of the first fluid in the pumping chamber 228 may evaporate from a liquid phase to a gaseous phase.

On the other hand, retracting the pump piston 224 too slowly may decrease overall pump frequency, and therefore pump discharge flow rate, below the requirements for fuel consumption in the IC engine 102. Although the accumulator 326 may help filter short-term peaks and troughs of fuel consumption by the IC engine 102 during a pumping duty cycle, the pump 206 must still produce a long-term flow rate of the first fluid that is greater than or equal to the long-term fuel consumption by the IC engine 102. Accordingly, aspects of disclosure provide a method for operating a positive displacement pump to maintain sufficient evaporation margin during retraction strokes of the pump piston 224 and sufficient pump 206 flowrate to meet IC engine 102 consumption of the first fluid.

Figure 3:
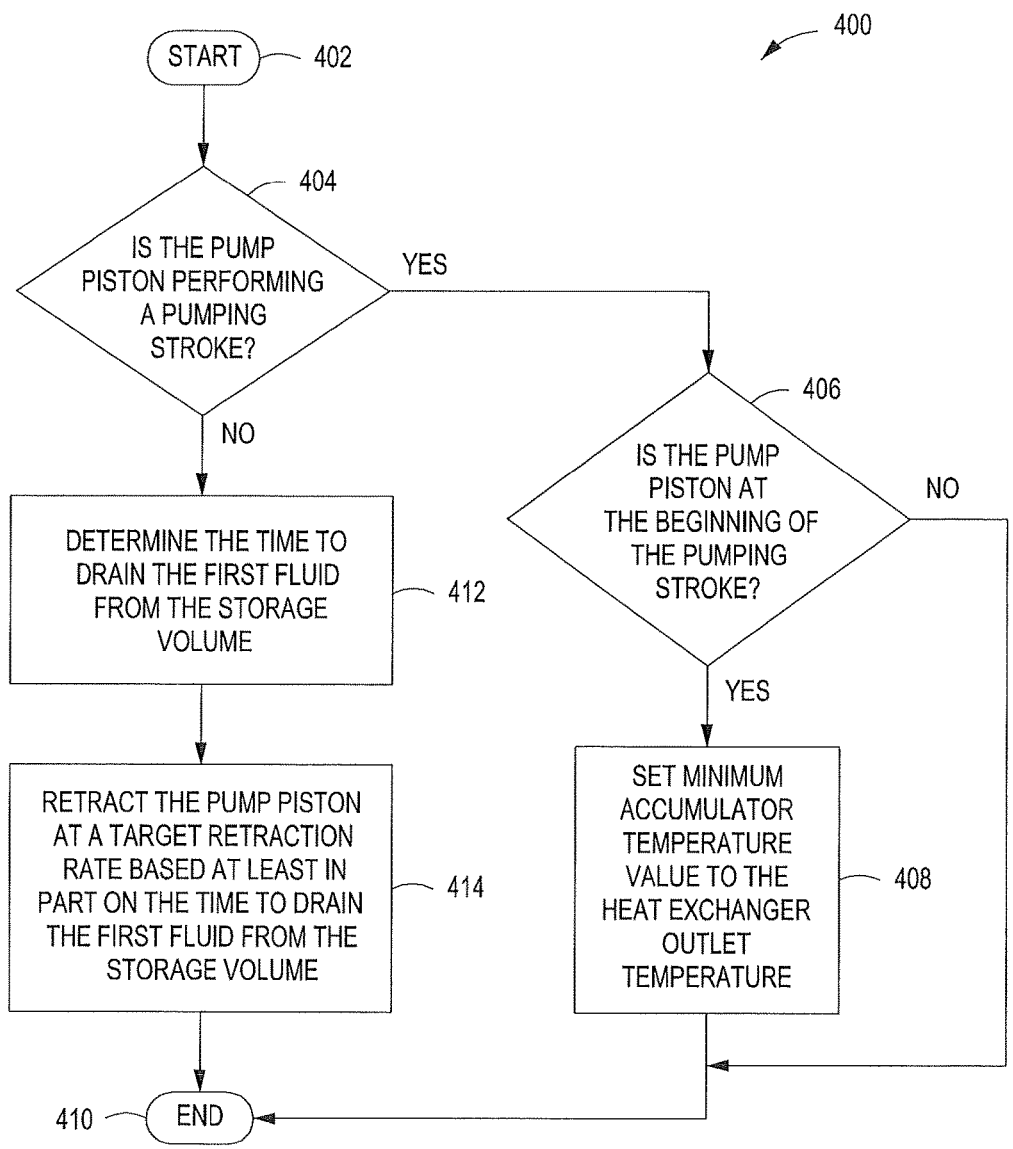
FIG. 3 is a flowchart of a method for operating a positive displacement pump, according to an aspect of the disclosure

FIG. 3 shows a flowchart for a method 400 for operating a positive displacement pump, according to an aspect of the disclosure. From the start 402, the method 400 advances to step 404, which determines whether the pump piston 224 is performing a pumping stroke. Whether the pump piston 224 is performing a pumping stroke may be determined by identifying the configuration of the switching valve 272. As previously discussed, if the switching valve 272 is in a first position, then the motor 208 drives the pump piston 224 in a pumping stroke, and if the switching valve 272 is in a second position, then the motor 208 drives the pump piston 224 in a retraction stroke. Further, the configuration of the switching valve 272 may be determined from a control signal to the actuator 296 of the switching valve 272, a position sensor on the switching valve 272, combinations thereof, or any other apparatus and method known in the art for determining the configuration of the switching valve 272. Alternatively or additionally, position sensors or accelerometers monitoring the location of the pump piston 224 with time may be used to determine whether the pump piston 224 is performing a pumping stroke or a retraction stroke.

If the pump piston 224 is performing a pumping stroke, then the method 400 proceeds to step 406, which determines whether the pump piston 224 is at the beginning of a pumping stroke, where the volume of the pumping chamber is at or near a maximum. Flow of working fluid to the motor 208, as sensed by the flowmeter 302 for example, may decrease while reconfiguring the switching valve 272 from a retracting position to a pumping position, and then assume a full pumping stroke flow value. Therefore, according to an aspect of the disclosure, analysis of a time trace of hydraulic fluid flow to identify the time when the hydraulic fluid flow decreases and then assumes the full pumping stroke flow value may be used to identify the moment in time when the pump piston 224 is at the beginning of the pumping stroke. Alternatively or additionally, the timing of the reconfiguration of the switching valve 272 or signals from sensors monitoring the position of the pump piston 224 may be used to determine when the pump piston 224 is at the beginning of the pumping stroke.

If the pump piston 224 is at the beginning of a pumping stroke, then the method 400 proceeds to step 408 where the controller 104 sets a minimum accumulator temperature value to the current heat exchanger 320 outlet temperature. According to an aspect of the disclosure, the current heat exchanger outlet temperature is determined from, a signal from the temperature sensor 324 located near the second port 332 of the heat exchanger 320. Else, if the pump piston 224 is not at the beginning of a pumping stroke, then the method 400 bypasses step 408 and proceed to the end 410.

Returning to step 404, if the pump piston is not performing a pumping stroke, then the method 400 proceeds to step 412 where a time to drain the first fluid from a storage volume is determined or calculated. The storage volume may include the volume of the first fluid in the accumulator 326, a volume of the first fluid in the heat exchanger 320, a volume of the fluid in the filter 322, a volume of any plumbing for the first fluid downstream of the pump 206 and upstream of the IC engine 102, combinations thereof, or any other volume containing the first fluid which provides a potential to deliver a flow of the first fluid to the IC engine 102.

The time to drain the first fluid from the storage volume may be determined by dividing an available mass of fluid in the storage volume by a mass rate of consumption of the first fluid by the IC engine 102 or a mass rate of the first fluid leaving the storage volume. According to an aspect of the disclosure, the available mass of fluid stored in the storage volume may be determined according to Equation 1.

$$\text{Available Mass} = \text{storage volume} * (\text{current density} - \text{reference density}) \quad \text{Equation 1}$$

where the current density is the density of the first fluid at the current accumulator pressure and the current accumulator temperature, and where the reference density is the density of the first fluid at the minimum reference pressure and the minimum accumulator temperature (see step 408).

The density of the first fluid may be determined from a physical or empirical model, such as an equation of state, thermodynamic tables, or any other density model known in the art. Such density models may be programmed into the controller 104 for computational access therein.

According to an aspect of the disclosure, the minimum reference pressure is a preset value stored in the controller 104, which is indicative of a minimum operating pressure of the fluid conditioning system 240, the IC engine 102, or both. Thus, the reference density in Equation 1 may be indicative of a density of the first fluid that is unavailable for effecting a flow of the first fluid to the IC engine 102. According to another aspect of the disclosure, the current accumulator pressure and the current accumulator temperature may be determined from the pressure sensor 350 and the temperature sensor 352, respectively.

The mass rate of consumption of the first fluid by the IC engine 102 may be determined or calculated from engine 102 operating data as a function of engine speed, engine configuration, engine load, ambient conditions, combinations thereof, or any other parameters having an effect on fuel consumption of the IC engine 102. For example, the mass rate of consumption of the first fluid by the IC engine 102 may be determined by multiplying a mass of fuel consumed by each engine cylinder per stroke by the frequency of fueling events per unit time and the number of engine 102 cylinders receiving the first fluid as fuel. According to an aspect of the disclosure, mass rates of fuel consumption by the IC engine 102 that are less than a predetermined threshold value may be rounded up to the predetermined threshold value.

According to an aspect of the disclosure a target retraction time for the pump piston 224 is equal to the time to drain the first fluid from the storage volume. According to another aspect of the disclosure, the target retraction time for the pump piston 224 is the time to drain the first fluid from the storage volume multiplied by a scaling factor, added to an offset factor, or both. The scaling factor and offset factor may be selected to advantageously determine the target retraction time for the pump piston 224 from the time to drain the first fluid from the storage volume. According to yet another aspect of the disclosure, a target retraction time for the pump piston 224 is the lesser of the time to drain the first fluid from the storage volume and a predetermined maximum retraction time value.

Next, the pump piston 224 is retracted at a target retraction rate based at least in part on the time to drain the first fluid from the storage volume in step 414, and the method 400 proceeds to the end 410. It will be appreciated that from the end 410, the controller 104 may repeat the method 400 at subsequent time intervals by the controller 104 during operation of the pump 206. Further, although the calculation for the method 400 have been disclosed on mass basis for the first fluid, it will be appreciated that the method 400 performed on a volumetric basis of the first fluid is also within the scope of the disclosure.

Figure 4:
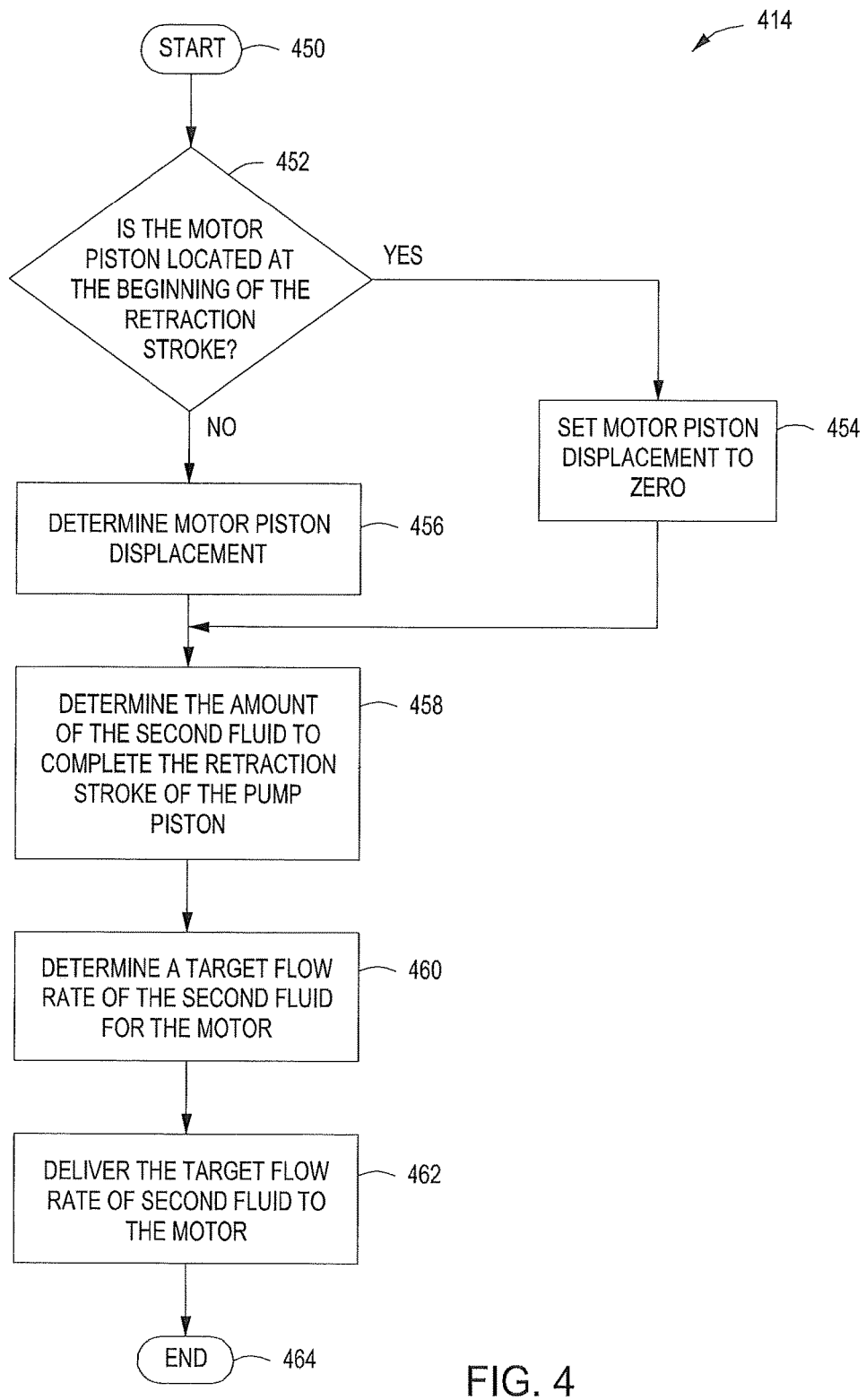
FIG. 4 is a flowchart of a method for retracting a pump piston at a target retraction rate based at least in part on a time to drain the first fluid from the storage volume, according to an aspect of the disclosure

FIG. 4 shows a flowchart of a method for retracting the pump piston 224 at a target retraction rate based at least in part on the time to drain the first fluid from the storage volume, according to an aspect of the disclosure. From the start 450 the method determines whether the motor piston 254 is located at the beginning of the retraction stroke in step 452. The controller 104 may determine if the motor piston 254 is located at the beginning of the retraction stroke by analyzing a time history of the pressure in the head-end chamber 258, analyzing a signal from a sensor indicative of the location of the motor piston 254 relative to the motor housing 250, analyzing a time history of a control signal to the switching valve 272, combinations thereof, or any other apparatus and methods known in the art for determining that the motor piston 254 is at the beginning of the retraction stroke.

As discussed previously, operation of the shuttle valve 306 may cause a change in pressure in the head-end chamber 258 of the motor 208 having a slope greater than a predetermined slope. Accordingly, the location of the beginning of the retraction stroke may be determined at the time when the pressure in the head-end chamber 258 decreases with a slope greater than the predetermined slope.

If the motor piston 254 is located at the beginning of the retraction stroke, then the controller 104 sets the motor piston 254 displacement to zero in step 454. If the motor piston 254 is not at the beginning of the retraction stroke, then the displacement of the motor piston 254 is determined in step 456. According to an aspect of the disclosure, the motor piston 254 displacement may be determined by a position sensor configured to detect the location of the motor piston 254 relative to the motor housing 250. According to another aspect of the disclosure, the controller 104 integrates flow of working fluid volume into the rod-end chamber 262 of the motor 208 during the retraction stroke with time, and divides the integrated working fluid volume by the area of the rod-end face 260 of the motor piston 254 to determine displacement of the motor piston 254 relative to the motor housing 250.

Next, in step 458 the method determines or calculates the amount of the second fluid or working fluid to complete the retraction stroke of the pump piston. The remaining volume of the retraction stroke may be determined by subtracting the current motor piston 254 displacement from a maximum motor piston 254 displacement during retraction, and then multiplying the difference by the area of the rod-end face 260 of the motor piston 254. According to an aspect of the disclosure, the maximum motor piston 254 displacement may be adjusted by a predetermined stroke safety offset value to better avoid overextension of the motor piston 254 during the retraction stroke.

Next, in step 460 the method determines or calculates a target flow rate of the second fluid for the motor 208. The target flow rate of the second fluid for the motor 208 may be determined as the amount of the second fluid to complete the retraction stroke of the pump piston divided by the time to drain the first fluid from the storage volume (see step 412 in FIG. 3). According to an aspect of the disclosure, the controller 104 may further compare the calculated target flow rate of the second fluid for the motor 208 to a predetermined minimum flow rate for the second fluid, and set the target flow rate of the second fluid for the motor 208 to the predetermined minimum flow rate when the calculated target flow rate for the second fluid is less than the predetermined minimum flow rate. The predetermined minimum flow rate may be selected to avoid unduly slow retraction of the pump piston 224.

Next, in step 462 the target flow rate of the second fluid is delivered to the motor 208. The controller 104 may effect delivery of the target flow rate of the second fluid to the motor 208 by controlling the variable displacement of the hydraulic pump 270 via the displacement actuator 298, for example. It will be appreciated that the method steps disclosed in FIGS. 3 and 4 may be performed with rapid frequency, such that the target flow rate of the second fluid to retract the pump piston 224 may be updated many times per retraction stroke.

Accordingly, aspects of the disclosure provide for controlling a retraction stroke of the pump piston 224 down to the slowest rate that still ensures sufficient flow to IC engine 102. In turn, the slower retraction rates tend to boost evaporation margin of the fluid within the pumping chamber 228, and in turn promote energy efficiency and pump life by avoiding inadvertent evaporation of the first fluid within the pumping chamber 228.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A pump system, comprising:
a pump including a pump housing defining a pump bore and a pump piston disposed in sliding engagement with the pump bore;
a storage volume in fluid communication with a discharge port of the pump, the pump piston being in selective fluid communication with the discharge port of the pump;
a hydraulic motor including a motor housing defining a motor bore and a motor piston disposed in sliding engagement with the motor bore, the motor piston being coupled to the pump piston by a shaft; and
a controller operatively coupled to the pump and the hydraulic motor, the controller being configured to:
determine a target retraction time to drain an amount of a first fluid from the storage volume; and
retract the pump piston within the pump bore at a target retraction rate based at least partly on the lesser of the time to drain the amount of the first fluid from the storage volume and a predetermined maximum retraction time, wherein a flow rate of a second fluid to the hydraulic motor is the amount of the second fluid to effect retracting the pump piston within the pump bore divided by the target retraction time.

2. The pump system of claim 1, wherein to determine the time to drain the amount of the first fluid from the storage volume, the controller is further configured to
determine an amount of the first fluid contained within the storage volume, and
determine a flow rate of the first fluid leaving the storage volume.

3. The pump system of claim 2, wherein to determine the time to drain the first fluid from the storage volume, the controller is further configured to divide the amount of the first fluid contained within the storage volume by the flow rate of the first fluid leaving the storage volume.

4. The pump system of claim 2, wherein to determine the amount of the first fluid contained within the storage volume, the controller is further configured to
calculate a first density of the first fluid based on a current temperature of the storage volume and a current pressure of the storage volume, and
calculate a second density of the first fluid based on a minimum temperature of the storage volume and a minimum reference pressure of the storage volume.

5. The pump system of claim 1, wherein the controller is further configured to determine the flow rate of the second fluid to the hydraulic motor based on the target retraction rate for the pump piston,
wherein the retracting the pump piston within the pump bore includes delivering the flow rate of the second fluid to the hydraulic motor.

6. The pump system of claim 5, wherein to determine the flow rate of the second fluid to the hydraulic motor, the controller is further configured to determine an amount of the second fluid to effect the retracting the pump piston within the pump bore.

* * * * *